United States Patent
Weigl et al.

(10) Patent No.: US 6,686,670 B1
(45) Date of Patent: Feb. 3, 2004

(54) ACCESS AND START/DRIVE AUTHORIZATION SYSTEM

(75) Inventors: Andreas Weigl, Linkenheim-Hochstetten (DE); Karl-Ernst Weiss, Ettlingen (DE); Clemens Schroff, Ubstadt-Weiher (DE); Bernd Weyerstall, Wuppertal (DE); Robert Hugel, Karlsruhe (DE); Bernd Diebold, Rheinau (DE); Piotr Szablewski, Wuppertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/807,637
(22) PCT Filed: Oct. 13, 1999
(86) PCT No.: PCT/DE99/03291
§ 371 (c)(1), (2), (4) Date: Nov. 8, 2001
(87) PCT Pub. No.: WO00/23303
PCT Pub. Date: Apr. 27, 2000

(30) Foreign Application Priority Data

Oct. 17, 1998 (DE) .......................................... 198 48 038

(51) Int. Cl.$^7$ .............................................. B60R 25/04
(52) U.S. Cl. ...................................... 307/10.5; 340/5.6
(58) Field of Search ............................. 307/10.1, 10.5; 340/5.2, 5.21, 5.22, 5.23, 5.26, 5.27, 5.6, 5.61, 5.63, 5.64; 455/418, 419

(56) References Cited

U.S. PATENT DOCUMENTS

| | | | |
|---|---|---|---|
| 4,446,380 A | | 5/1984 | Mochida et al. |
| 5,552,641 A | * | 9/1996 | Fischer et al. ............. 307/10.5 |
| 6,332,572 B1 | * | 12/2001 | Yamamoto et al. ......... 235/382 |
| 6,525,433 B1 | * | 2/2003 | Enoyoshi et al. .......... 307/10.5 |
| 6,577,227 B1 | * | 6/2003 | Kirchlinde ................. 340/5.62 |

FOREIGN PATENT DOCUMENTS

| | | |
|---|---|---|
| DE | 43 29 697 | 3/1995 |
| DE | 44 03 655 | 8/1995 |
| GB | 2 262 074 | 6/1993 |

* cited by examiner

*Primary Examiner*—Gregory J. Toatley, Jr.
(74) *Attorney, Agent, or Firm*—Kenyon & Kenyon

(57) ABSTRACT

An access- and starting/driving-authorization system for a motor vehicle, having a portable transponder and a control unit accomodated in the motor vehicle, in order to control the smart master-key system and the engine control unit. In inquiry/response dialogs, the transponder and the control unit enabling or blocking access to the motor vehicle, and the starting and driving of the motor vehicle, using sets of code information that are matched to each other. Starting and driving the motor vehicle after forcibly entering the motor vehicle and replacing the engine control unit, including a vehicle immobilizer and a transponder of the control units relevant for starting and driving, is prevented in that the enabling of the motor-vehicle to be started and driven, after a successful starting/driving-authorization inquiry/response dialog, is rendered dependent on a preceding, successful access-authorization inquiry/response dialog.

18 Claims, 1 Drawing Sheet

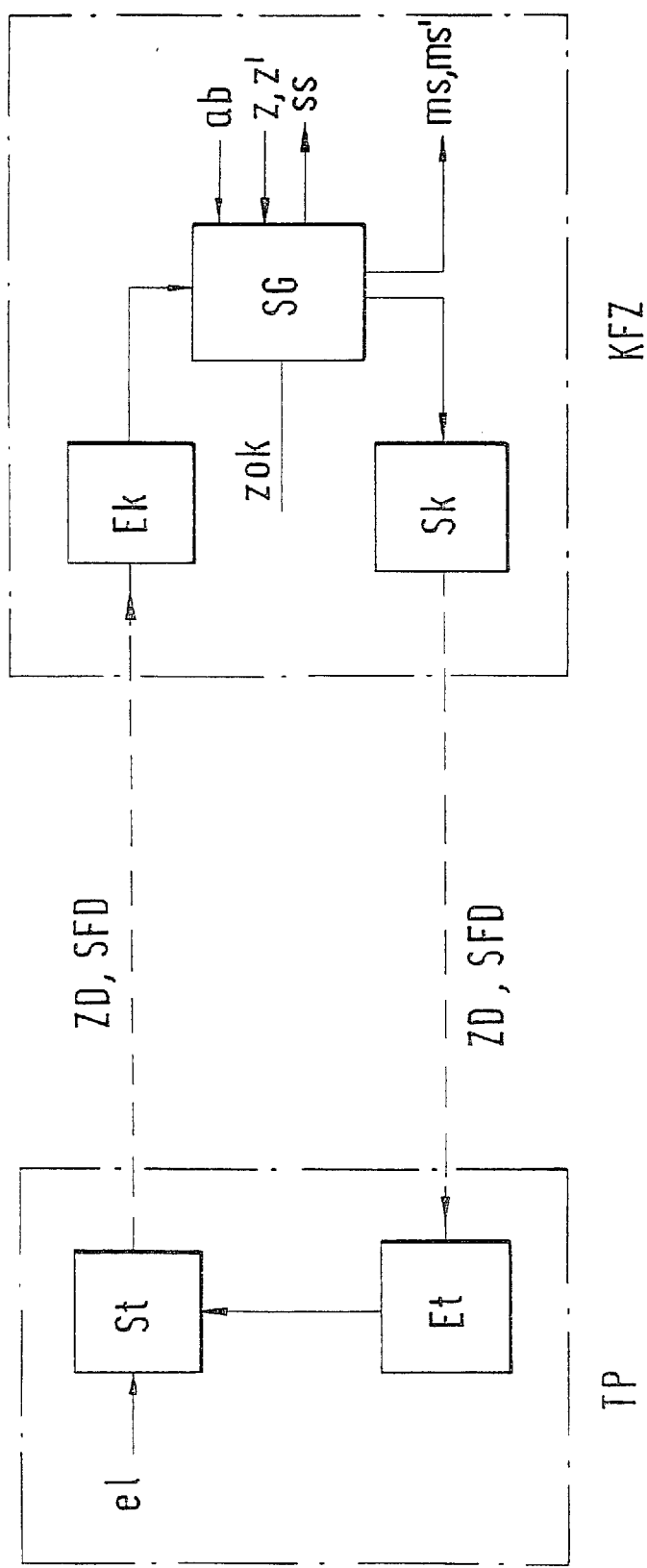

ACCESS AND START/DRIVE AUTHORIZATION SYSTEM

FIELD OF THE INVENTION

The present invention relates to an access- and starting/driving-authorization system for a motor vehicle, having a portable transponder and a control unit, which is accomodated in the motor vehicle and is for the smart master-key system and the engine control unit; in inquiry/response dialogs using sets of code information matched to each other, the transponder and the control unit enabling or blocking access to the motor vehicle, and the starting and driving of the motor vehicle.

BACKGROUND INFORMATION

Many different transponder and control-unit designs based on different transmission methods are known for such authorization systems. For accessing, or for starting and driving, both the control units and the inquiry/response dialogs function, as a rule, independently of one another, and use different sets of code information. However, this has the disadvantage, that the motor vehicle can be started and driven when the motor vehicle is forcibly entered, and the engine control unit having a transponder-controlled vehicle immobilizer is replaced with another engine control unit having a transponder matched to it. Therefore, the starting/driving-authorization system is not reliable when the motor vehicle is forcibly entered and the engine control unit is replaced.

As is indicated in German Patent No. 44 03 655 C2, it is also known that the access-authorization inquiry/response dialog can be used, not only to unlock and lock the smart master-key system, but also to simultaneously activate an additional control unit that enables or disables the engine starting system. The starting and driving operation of the motor vehicle is initiated in a known manner, e.g. by a starter switch.

SUMMARY OF THE INVENTION

The object of the present invention is to considerably improve an access- and starting/driving-authorization system of the type mentioned at the outset, in its protection against unauthorized replacement of the engine control unit and the access control system.

This object is achieved in accordance with the present invention, in that the enabling of the starting and the driving of the motor vehicle after a successful starting/driving-authorization inquiry/response dialog is rendered dependent on a preceding access-authorization inquiry/response dialog being successful.

In this context, the improved starting/driving-authorization system requires proper access to the motor vehicle beforehand, which is only possible using the transponder matched to the built-in access authorization. Having a new engine control unit and the matching transponder is not sufficient for starting and driving the motor vehicle after forcibly entering it and replacing the engine control unit. The access-authorization system and the starting/driving-authorization system are compulsorily coupled, which considerably increases the reliability.

The access-authorization system functions in a simple manner, in that the initiation of the access-authorization inquiry/response dialog at the control unit is dependent on an initialization signal, which is triggerable by a manual switching measure at the motor vehicle or a manual switching measure at the transponder; or in that the initiation of the access-authorization inquiry/response dialog is rendered dependent on the presence of the transponder in a field of the motor vehicle monitored by a proximity switch in the motor vehicle. The operation of a door handle or the like is preferably used as a switching measure at the motor vehicle. When a proximity switch is present, it determines if a person is in the monitored field of the motor vehicle. If so, then an access-authorization inquiry signal of the control unit is triggered, which can only be responded to correctly when this person is carrying the appropriate transponder with himself or herself.

According to the present invention, the method for the starting/driving-authorization system after a successful access-authorization inquiry/response dialog is such, that the access control unit initiates the unlocking of the smart master-key system after a successful access-authorization inquiry/response dialog, and holds a set of additional information in readiness for the subsequent starting/driving-authorization inquiry/response dialog.

In accordance with a development of the starting/driving-authorization system, it is provided that the initiation of the starting/driving-authorization inquiry/response dialog be rendered dependent on putting the transponder down in a storage box in the motor vehicle, or be rendered dependent on another initialization signal, which is triggered in the motor vehicle, and is for the control unit functionally assigned to the starting/driving authorization. According to this method, in response to a successful starting/driving-authorization inquiry/response dialog, the engine control unit is only triggered to enable starting and driving when a set of enabling, additional information is present from the previous access-authorization inquiry/response dialog.

The protection against unauthorized starting and driving of the motor vehicle can be further increased by additionally rendering the enabling of the starting and driving of the motor vehicle dependent on the output state of the smart master-key system, or by incorporating predefined states and/or operating sequences of other vehicle components, in order to enable the motor vehicle to be started and driven.

In addition to the engine control unit, it is especially advantageous when other components required for starting and driving a motor vehicle, e.g. the transmission control system, are enabled for starting and driving, by means of the set of additional information transmitted to these components by the respective control unit, after the access inquiry/response dialog has been carried out successfully.

Using a set of additional information, which is acquired and stored in the control unit after properly locking the vehicle, and is routed to all of the incorporated components, and after disconnecting the supply/operating voltage of the incorporated components, the particular control unit, as well as the engine control unit and all other components incorporated in the system designed according to the present invention, are brought into a functionally disabled state, which can only be cancelled by the set of additional information present after correctly accessing the vehicle. This renders exchanged/removed components unusable as replacement parts, which considerably reduces the incentive to steal.

An advantageous refinement of the present invention provides a single control unit in place of separate control units for the access control and the starting/driving-authorization control. However, these two objectives can also be fulfilled by another control unit already existing for other purposes, e.g. the engine control unit, by appropriately expanding its function.

An advantageous refinement of the present invention provides for the transponder, control unit, engine control unit, and other operationally relevant components being coded on the manufacturing end, at the vehicle manufacturer. Components that are not coded due to being improperly exchanged are detected by the other components, thereby leading to inoperativeness. Specially protected authorization tables provided with the appropriate authorization (e.g. "Red Key", master transponder, etc.) are necessary for coding.

The link according to the present invention, between the locking system and the vehicle immobilizer or engine control unit, for the purpose of exchanging data, provides the additional advantage that, in response to advantageously internal actuating elements of the locking system being operated in an unlocked motor vehicle, in a manner deviating from normal operation, a forcible removal of the vehicle ("car-napping") can be registered, whereupon the operationally relevant control units of the motor vehicle only allow the motor vehicle to be driven a short distance before they shut themselves down entirely, and therefore shut the motor vehicle down. After an erroneous instance of triggering, the granted path of travel either allows the driver to get out of danger or, after having to leave the vehicle, to remove himself from a threatening situation or, given the possibility that the criminal(s) can temporarily escape with the forcibly removed motor vehicle, to no longer be threatened. For example, operating the inner door handle repeatedly (preferably that of the driver's door) can be used as a trigger, since this handle is also normally used when getting out, and the emergency signalling can be concealed.

BRIEF DESCRIPTION OF THE DRAWINGS

FIG. 1 shows a block diagram illustrating that the checks for the access and starting/driving authorization are performed by a single, special control unit.

DETAILED DESCRIPTION

Represented in the drawing are transmitting device Sk and receiving device Ek of motor vehicle KFZ, and transmitting device St and receiving device Et of transponder TP, which are required for carrying out access-authorization inquiry/response dialog ZD and starting/driving-authorization inquiry/response dialog SFD, and form transmission channels Sk-ET, as well as St-Ek, in both transmission directions. In this context, the physical design of these two transmission channels Sk-Et/St-Ek is unimportant; different designs for dialog ZD and dialog SFD can also be used.

Accommodated in motor vehicle KFZ is a control unit SG, which controls the engine control unit and the smart master-key system in the above-described manner. The method of operation of the access- and starting/driving-authorization system according to the present invention proceeds in the following manner:

If the driver equipped with correct transponder TP wants to access motor vehicle KFZ, control unit SG receives an initialization signal z, which is triggered in different ways, and can be transmitted to control unit SG. In this manner, e.g. operating a door handle or another switch element at vehicle KFZ can directly generate initialization signal z. However, the initialization signal can also be introduced by a switching measure el at transponder TP, and recognized as an initialization signal z via transmitting device St and receiving device Ek. The initiation can also be carried out automatically by a proximity switch, which registers the presence of a person in a monitored field of the motor vehicle.

If the initiation of access-authorization inquiry/response dialog ZD is detected at control unit SG, this dialog ZD proceeds in a known manner, via transmission channels Sk-Et and St-Ek; then, after successfully identifying an appropriate transponder, control unit SG enables the smart master-key system to be unlocked, as is indicated by control signal ss. The unlocking can proceed in a known manner, depending on the smart master-key system used.

A set of additional information zok indicating properly gained access to motor vehicle KFZ is also stored in control unit SG, it being fully possible to incorporate the output state of the smart master-key system, as well.

The procedure is the same in the case of locking motor vehicle KFZ, access-authorization inquiry/response dialog ZD that is carried out for this purpose, as well, being initiated manually or automatically after the vehicle door(s) are closed. Control unit SG stores a set of corresponding, additional information zok and, using information ms, controls the engine control unit and other components integrated into the system of the present invention, in such a manner, that they are not functional until a set of information is received indicating that motor vehicle KFZ has been accessed properly.

If the driver has sat down on the driver seat, then transponder TP is placed, for example, in a storage box, which leads to a control signal ab being initiated at control unit SG. This indicates to control unit SG, that starting/driving-authorization inquiry/response dialog SFD can or should be carried out. In motor vehicle KFZ, this control signal ab can also be triggered by other switching measures, which can be dependent on the use of special transponder embodiments and devices, in order to carry out starting/driving-authorization dialog SFD. Furthermore, the switching conditions and/or operating sequences of additional vehicle components can also be included in the triggering of this control signal ss.

Starting/driving-authorization inquiry/response dialog SFD proceeds in a known manner, over transmission channels Sk-Et and St-Ek again, other sets of code information being usable as well, as in the case of access-authorization inquiry/response dialog ZD. If starting/driving-authorization inquiry/response dialog SFD has proceeded successfully, then it is crucial that the enabling ms of the engine control system, and of other utilized components of motor vehicle KFZ designed according to the present invention, only occurs when control unit SG has registered additional information zok of successfully ended access-authorization inquiry/response dialog ZD. This ensures that, after motor vehicle KFZ has been forcibly entered and the engine control unit having control unit SG has been exchanged, motor vehicle KFZ is prevented from being started and driven. The control unit can be a part of the engine control unit, or can constitute a separate unit.

If abnormal operation of the inner driver-door handle, e.g. consecutive and reputed operation of the inner driver-door handle within a predefined time interval, causes control unit SG to receive an "abnormal" signal Z' from the smart master-key system, control unit SG interprets this as an emergency signal, and transmits a corresponding set of information ms' to the engine control unit and other operationally relevant components integrated in the system of the present invention. The set of information initiates a subroutine in these components, after whose execution all of these components are locked and rendered non-functional. In this manner, the motor vehicle is automatically shut down after being driven a short time or distance. Any transponder TP that could still be there is detected beforehand by the driving authorization system, and blocked from further use. The motor vehicle can only be brought out of this state after a successful access-inquiry/response dialog ZD, when another transponder TP recognized by control unit SG is used for this purpose.

What is claimed is:

1. An access and starting/driving-authorization system for a motor vehicle, comprising:
    an engine control unit;
    a smart master-key system;
    a portable transponder; and
    a control unit included in the motor vehicle, and associated with the smart master-key system and the engine control unit, the control unit communicating with the transponder using sets of code information matched to each other in inquiry/response dialogs, the control unit enabling or blocking access to, starting, and driving of the motor vehicle in conjunction with the transponder;
    wherein whether the motor vehicle is enabled to be started and driven after a successful starting/driving-authorization inquiry/response dialog, using the transponder, depends upon a preceding, successful access-authorization inquiry/response dialog using the transponder.

2. The access- and starting/driving-authorization system as recited in claim 1, wherein initiation of the access-authorization inquiry/response dialog at the control unit is dependent upon an initialization signal, the initialization signal being triggered by at least one of a manual switching measure at the motor vehicle, and a switching measure at the transponder.

3. The access- and starting/driving-authorization system as recited in claim 1, wherein initiation of the access-authorization inquiry/response dialog is dependent on the presence of the transponder in a motor-vehicle field monitored by a proximity switch in the motor vehicle.

4. The access- and starting/driving-authorization system as recited in claim 1, wherein the control unit initiates unlocking of the smart master-key system after a successful access-authorization inquiry/response dialog, the control unit holds a set of additional information in readiness for a subsequent starting/driving-authorization inquiry/response dialog, and the control unit is enabled to transmit the set of additional information to other control units, using a control command.

5. The access- and starting/driving-authorization system as recited in claim 1, wherein initiation of the starting/driving-authorization inquiry/response dialog requires one of
    a) the transponder to be placed in a storage box in the motor vehicle; and
    b) a further initialization signal, the further intialization signal being triggered in the motor vehicle for the control unit.

6. The access- and starting/driving-authorization system as recited in claim 1, wherein, in response to a successful starting/driving-authorization inquiry/response dialog, the engine control unit is triggered to enable starting and driving if a set of additional information about the preceding access-authorization inquiry/response dialog is present.

7. The access- and starting/driving-authorization system as recited in claim 1, wherein the motor vehicle is enabled to be started and driven depending upon the switching state of the smart master-key system.

8. The access- and starting/driving-authorization system as recited in claim 1, wherein at least one of predefined states and operational sequences of additional vehicle components are included for enabling the motor vehicle to be started and driven.

9. The access- and starting/driving-authorization system as recited in claim 1, wherein, in addition to the engine control unit, further components necessary for starting and driving the motor vehicle are also put into a functionable operating state by a trigger issued from the control unit after a successfully executed access-authorization inquiry/response dialog.

10. The access- and starting/driving-authorization system as recited in claim 1, wherein the engine control unit and further components of the motor vehicle are put into a non-functioning state by a corresponding set of information of the control unit after doors of the motor vehicle are locked, and are rendered operational after reception of a control command transmitted by the control unit only after a successfully executed access-authorization inquiry/response dialog.

11. The access- and starting/driving-authorization system as recited in claim 1, wherein the engine control unit and further components of the motor vehicle are put into a non-functioning state after an operating voltage is disconnected, and can only be put back into operation after reception of a control command transmitted by the control unit after a successfully executed access-authorization inquiry/response dialog.

12. The access- and starting/driving-authorization system as recited in claim 1, wherein a triggering pulse emitted by the control unit after a sucessfully executed access-authorization inquiry/response dialog is transmitted in encoded form.

13. The access- and starting/driving-authorization system as recited in claim 1, wherein the transponder, the control unit, and the engine control unit are coated together with respect to each other, during manufacture, in such a manner, that the absence or exchange of one of these components without subsequent recoding of all system components renders starting and driving impossible, coding taking place using special security measures.

14. The access- and starting/driving-authorization system as recited in claim 13, wherein the use of special security measures include special authorization verifiers.

15. The access- and starting/driving-authorization system as recited in claim 1, wherein the control unit indicates an emergency situation in response to one or more inner door handles being operated in a particular manner, the control unit reacting to the emergency situation by emitting a special control signal, the special control signal inducing the engine control unit to:
    a) allow the motor-vehicle to be started and driven for a short duration;
    b) subsequently shut down the motor vehicle down completely; and
    c) render it impossible for the vehicle to be used further.

16. The access- and starting/driving-authorization system as recited in claim 15, wherein the starting/driving-authorization inquiry/response dialog is initiated after the special control signal is received, and all transponders recognized are blocked from future use with the motor vehicle.

17. The access- and starting/driving-authorization system as recited in claim 16, wherein blocking operation of all components is canceled only after a successful access inquiry/response dialog, using a transponder different from the blocked transponder.

18. The access- and starting/driving-authorization system as recited in claim 17, further comprising:
at least one additional operationally relevant component.

* * * * *

UNITED STATES PATENT AND TRADEMARK OFFICE
CERTIFICATE OF CORRECTION

PATENT NO. : 6,686,670 B1
DATED : February 3, 2004
INVENTOR(S) : Andreas Weigl et al.

It is certified that error appears in the above-identified patent and that said Letters Patent is hereby corrected as shown below:

Column 1,
Line 24, change "disadvantage, that" to -- disadvantage that --

Column 2,
Line 16, change "is such, that" to -- is such that --

Column 5,
Line 46, change "dialog, the control" to -- dialog; the control --

Column 6,
Line 40, change "are coated together" to -- are coded together --
Line 48, change "measures includes" to -- measures include --

Signed and Sealed this

Twenty-eighth Day of June, 2005

JON W. DUDAS
*Director of the United States Patent and Trademark Office*